United States Patent
Reitz

(10) Patent No.: US 11,161,404 B2
(45) Date of Patent: Nov. 2, 2021

(54) DRIVETRAIN UNIT WITH TRANSMISSION-SIDE MOUNTING OF A TRIPLE CLUTCH OF A HYBRID MODULE

(71) Applicant: Schaeffler Technologies AG & Co. KG, Herzogenaurach (DE)

(72) Inventor: Dierk Reitz, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 84 days.

(21) Appl. No.: 16/493,333

(22) PCT Filed: Feb. 26, 2018

(86) PCT No.: PCT/DE2018/100167
§ 371 (c)(1),
(2) Date: Sep. 12, 2019

(87) PCT Pub. No.: WO2018/171830
PCT Pub. Date: Sep. 27, 2018

(65) Prior Publication Data
US 2021/0162853 A1 Jun. 3, 2021

(30) Foreign Application Priority Data
Mar. 23, 2017 (DE) .......................... 102017106278.5

(51) Int. Cl.
*B60K 6/48* (2007.10)
*B60K 6/387* (2007.10)
(Continued)

(52) U.S. Cl.
CPC .............. *B60K 6/387* (2013.01); *F16D 25/10* (2013.01); *B60K 2006/4825* (2013.01);
(Continued)

(58) Field of Classification Search
CPC . B60K 6/387; B60K 2006/4825; F16D 25/10; F16D 2021/0692; F16D 21/06; F16D 25/082; B60Y 2400/4244; H02K 7/108
See application file for complete search history.

(56) References Cited

U.S. PATENT DOCUMENTS 6,966,860 B2 * 11/2005 Heitmann ............... F16H 3/663
475/10
7,364,523 B2 * 4/2008 Heitmann ............... B60K 6/40
475/5
(Continued)

FOREIGN PATENT DOCUMENTS

CN 101922532 A 12/2010
CN 101927690 A 12/2010
(Continued)

*Primary Examiner* — David J Hlavka

(57) ABSTRACT

A drivetrain unit for a motor vehicle comprises a hybrid module, which includes an electric machine having a stator and a rotor, with at least two clutches having clutch parts that are respectively connectable to one another. A rotor carrier is provided, to which the rotor is attached and to which in each case one clutch part of the at least two clutches is connected for conjoint rotation therewith. A transmission device interacts with the hybrid module by a first transmission input shaft and the rotor carrier is mounted on the first transmission input shaft so as to be rotatable relative thereto.

10 Claims, 1 Drawing Sheet

(51) Int. Cl.
  *F16D 25/10* (2006.01)
  *F16D 21/06* (2006.01)
  *F16D 25/08* (2006.01)
  *H02K 7/108* (2006.01)

(52) U.S. Cl.
  CPC ....... *B60Y 2400/4244* (2013.01); *F16D 21/06* (2013.01); *F16D 25/082* (2013.01); *F16D 2021/0692* (2013.01); *H02K 7/108* (2013.01)

(56) References Cited

U.S. PATENT DOCUMENTS

| | | | | |
|---|---|---|---|---|
| 8,241,161 | B2* | 8/2012 | Schoenek | B60W 20/00 475/5 |
| 8,453,817 | B2* | 6/2013 | Schrage | B60K 6/405 192/48.611 |
| 2004/0211604 | A1 | 10/2004 | Heitmann et al. | |
| 2006/0194665 | A1 | 8/2006 | Heitmann et al. | |
| 2010/0314185 | A1* | 12/2010 | Schoenek | B60K 6/40 180/65.7 |
| 2011/0240384 | A1* | 10/2011 | Roske | B60K 6/38 180/65.22 |
| 2011/0259698 | A1* | 10/2011 | Arnold | B60K 6/405 192/48.1 |
| 2012/0255826 | A1 | 10/2012 | Satoshi et al. | |

FOREIGN PATENT DOCUMENTS

| | | |
|---|---|---|
| CN | 102205789 A | 10/2011 |
| CN | 102308108 A | 1/2012 |
| CN | 205768618 U | 12/2016 |
| DE | 10036504 A1 | 2/2001 |
| DE | 112012001033 T5 | 12/2013 |
| DE | 102013006857 A1 | 10/2014 |
| DE | 102015215895 A1 | 2/2017 |
| EP | 1857700 A1 | 11/2007 |

* cited by examiner

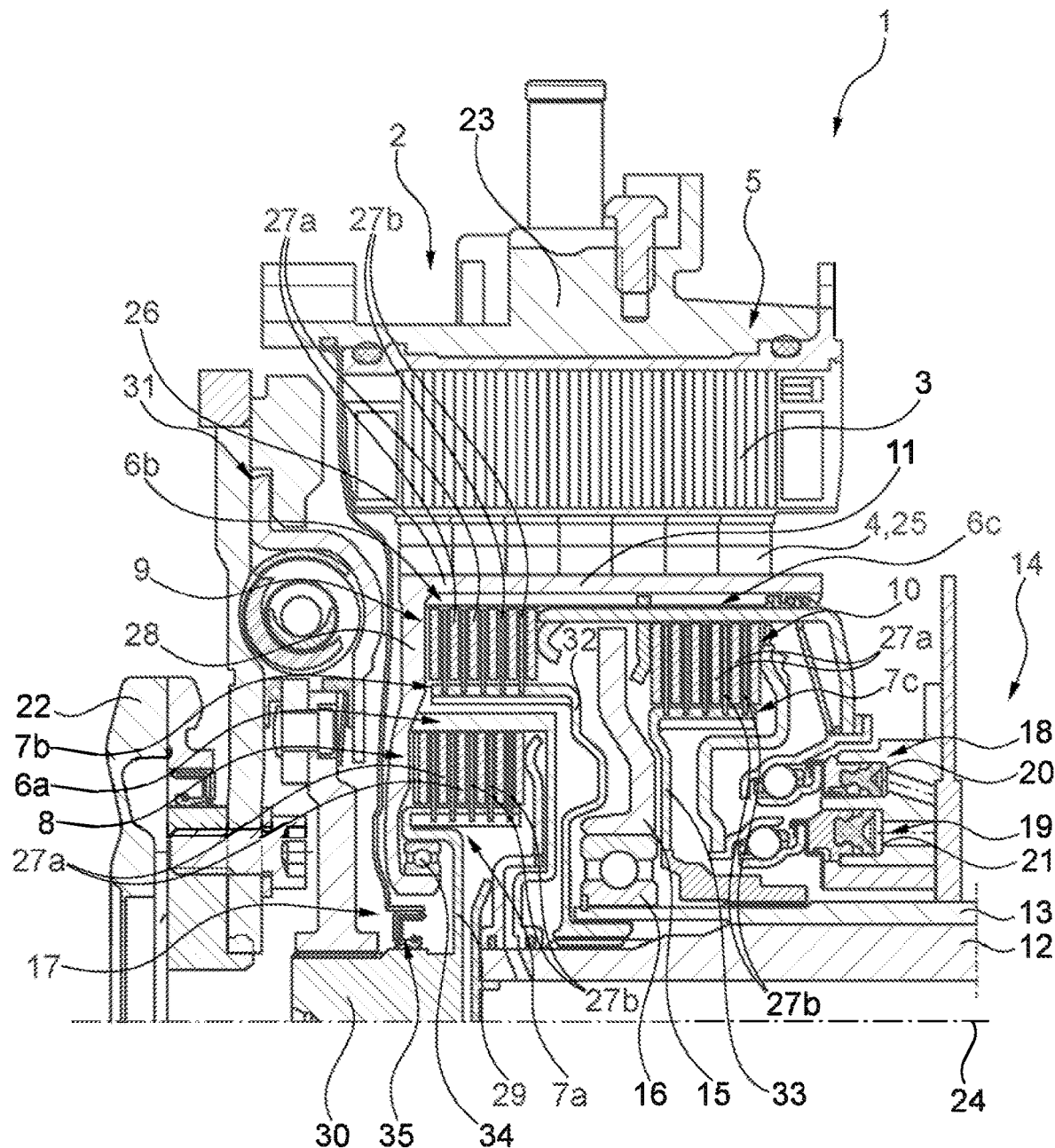

DRIVETRAIN UNIT WITH TRANSMISSION-SIDE MOUNTING OF A TRIPLE CLUTCH OF A HYBRID MODULE

CROSS-REFERENCE TO RELATED APPLICATIONS

This application is the U.S. National Phase of PCT Appln. No. PCT/DE2018/100167 filed Feb. 26, 2018, which claims priority to DE 102017106278.5 filed Mar. 23, 2017, the entire disclosures of which are incorporated by reference herein.

TECHNICAL FIELD

The present disclosure relates to a drivetrain unit for a motor vehicle, such as a passenger car, truck, bus or other commercial vehicle, having a hybrid module, which is equipped with an electric machine that has a stator and a rotor, with at least two clutches, which have clutch parts that are respectively connectable to one another, and with a rotor carrier, wherein the rotor is attached to the rotor carrier and to which in each case one clutch part of the at least two clutches is connected for conjoint rotation therewith, and with a transmission device, which interacts with/is coupled or can be coupled to the hybrid module by means of a (second) transmission input shaft. Thus, the present disclosure relates to a drivetrain unit in the form of an assembly comprising a hybrid module (which is in turn in the form of a modular device/modular system comprising an electric machine and at least two clutches) as well as a transmission device.

BACKGROUND

The prior art of the type in question is known from DE 10 2013 006 857 A1, for example. This document discloses a hybrid drive assembly comprising an electric machine. Arranged radially on the inside of a support region is a separating clutch, wherein the separating clutch is designed as a multiplate clutch, thus enabling a coolant emerging from the separating clutch to be fed to a plurality of coolant channels via a coolant passage.

With the hybrid modules known from the prior art, however, it has been found to be disadvantageous that the individual parts thereof are generally supported in a relatively complex manner. In known designs, a wall is often provided on a hybrid module part fixed to the housing, the parts then being supported on said wall. Owing to the required dimensions of this wall fixed to the housing, a relatively large amount of installation space is required, especially in the axial direction of the hybrid module. As a result, in turn, the potential uses of the hybrid module are reduced.

SUMMARY

It is therefore the object of the present disclosure to eliminate the disadvantages known from the prior art and, in particular, to make available a drivetrain unit by means of which the installation space of the hybrid module is further reduced.

According to the present disclosure, this is achieved by the fact that the rotor carrier is mounted on the (second) transmission input shaft so as to be rotatable relative thereto.

By virtue of the support/mounting of the rotor carrier of the transmission input shaft of the transmission device, the rotor carrier serves not only as a central mounting for the rotor but also as a central mounting for the individual clutch parts of the clutches. As a result, it is possible to combine several of the previously implemented isolated bearing locations into a central mounting. Thus, a housing wall, previously required to support the rotor carrier, is also eliminated. The result is a significant reduction in the axial installation space of the hybrid module.

The rotor carrier is preferably mounted directly on the (second) transmission input shaft so as to be rotatable relative thereto.

It is also advantageous if the rotor carrier has a central support member (preferably extending in the radial direction), which is supported on the (second) transmission input shaft via a rolling bearing. A mounting which is highly effective for the radial support of the rotor carrier is thereby obtained.

It is also expedient if a first clutch of the at least two clutches has a first clutch part (preferably attached to the rotor carrier for conjoint rotation therewith) and a second clutch part, which is mounted on the rotor carrier (preferably via a further rolling bearing) so as to be rotatable relative thereto. As a result, the first clutch is mounted/supported fully on the rotor carrier.

As regards the actuation of the first clutch, it is advantageous if the first clutch is actuated by means of a first actuating system having a rotary union. A particularly space-saving actuating system is thereby implemented for the first clutch.

In this context, it is expedient if the first actuating system is designed in such a way that a pressurized fluid required for the actuation of the first clutch is fed in via an input shaft (hybrid module input shaft) which is coupled to the second clutch part of the first clutch for conjoint rotation therewith.

It is furthermore advantageous if a second clutch of the at least two clutches has a first clutch part (preferably attached to the rotor carrier for conjoint rotation therewith) and a second clutch part, which is connected to a first transmission input shaft for conjoint rotation therewith. Thus, the second clutch is also supported in a reliable manner.

If the second clutch is actuated by means of a second actuating system, which has a central slave cylinder or a rotary union, the actuation of the second clutch is also implemented in a particularly space-saving manner.

In this context, it is furthermore advantageous if a third clutch of the at least two clutches has a first clutch part (preferably attached to the rotor carrier for conjoint rotation therewith) and a second clutch part, wherein the second clutch part is connected to a/the second transmission input shaft for conjoint rotation therewith. The third clutch is thereby supported in a reliable manner on the second transmission input shaft.

Accordingly, it is in turn advantageous for the third clutch to actuate said clutch by means of a third actuating system, which has a central slave cylinder or a rotary union.

It is furthermore preferred to actuate both the second clutch and the third clutch by means of a common slave cylinder, namely a dual slave cylinder/double slave cylinder, particularly preferably by means of a double CSC (dual concentric slave cylinder). The installation space requirement for the second and third actuating systems is thereby further reduced.

If a first transmission input shaft projects through a second transmission input shaft designed as a hollow shaft (preferably supporting the central support member), it is a simple matter during assembly to mount the central support member on the transmission input shaft which supports it.

It is furthermore advantageous if one or more or all of the at least two clutches is/are of wet design.

It is also expedient if an input shaft of the hybrid module is mounted (preferably directly) on the rotor carrier so as to be rotatable relative thereto.

In other words, the proposal according to the present disclosure is to mount at least one double clutch, as a further preference a triple clutch (first, second and third clutch), on a transmission side (transmission input shaft). According to the present disclosure, a hybrid module having the (preferably wet) double/triple clutch and an electric machine is employed. The double/triple clutch and the electric machine are supported on a transmission input shaft using a ball bearing. An input shaft of the hybrid module is in turn supported on a rotor carrier.

BRIEF DESCRIPTION OF THE DRAWINGS

The present disclosure is now explained in greater detail below by means of a FIGURE in accordance with a preferred illustrative embodiment.

The single FIGURE, shows a longitudinal section through a drivetrain unit according to the present disclosure, together with a hybrid module and transmission input shafts of a transmission device, which are rotationally coupled to the hybrid module.

The FIGURE is of a purely schematic nature and serves only to aid understanding of the present disclosure.

DETAILED DESCRIPTION

A drivetrain unit 1 according to the present disclosure is illustrated in the FIGURE. In the FIG, the drivetrain unit 1 has already been inserted in a drivetrain of a motor vehicle. In particular, the drivetrain unit 1 forms a unit comprising a hybrid module 2 and a transmission device 14. The transmission device 14 is configured as a conventional motor vehicle transmission, in this case as a dual clutch transmission. In this illustrative embodiment, for the sake of clarity, just two transmission input shafts 12 and 13 of the transmission device 14 are depicted in addition to the hybrid module 2. Moreover, the drivetrain unit 1 is already rotationally coupled on the part of the hybrid module 2 to an output shaft 22 (crankshaft) of an internal combustion engine, e.g. a spark ignition engine or diesel engine, for conjoint rotation therewith. The hybrid module 2 is a module comprising an electric machine 5, which can be used as an electric motor and a generator, as well as a plurality of clutches 8, 9, 10. Consequently, the drivetrain unit 1 is implemented as a hybrid drivetrain unit 1 and is used in operation in a hybrid drivetrain.

The hybrid module 2 has a housing 23. A stator 3 of the electric machine 5 is mounted on/attached to a (radial) inner side of the housing 23. A rotor 4 of annular design in the form of a plurality of laminated cores 25 is arranged radially on the inside of the stator 3 (in relation to the axis of rotation 24 of the hybrid module 2/of the transmission input shafts 12, 13). The rotor 4 is mounted on a rotor carrier 11 for conjoint rotation therewith. The rotor carrier 11 has a sleeve region 26, on the radial outer side of which the rotor 4/the laminated core 25 is firmly attached.

First clutch parts 6a, 6b and 6c of three clutches 8, 9, 10 are furthermore connected to the rotor carrier 11 for conjoint rotation therewith. The respective clutch 8, 9, 10 is designed as a multiplate friction clutch. In particular, the three clutches 8, 9, 10 are all embodied as wet clutches.

A first clutch 8 essentially has a first clutch part 6a and a second clutch part 7a. The first clutch part 6a is a part of the rotor carrier 11 that rotates with the latter. In particular, the first clutch part 6a has a plurality of first friction elements 27a in the form of friction plates, which are arranged spaced apart in the axial direction and in a manner which enables them to be moved relative to one another. The rotor carrier 11 forms a disk region 28 which extends inward in a radial direction from the sleeve region 26. Provided on the disk region 28 is a receiving region extending in the axial direction, which forms the first clutch part 6a and receives the first friction elements 27a in a manner which allows them to move relative to one another in the axial direction but prevents relative rotation. A plurality of second friction elements 27b, which are again embodied as friction plates, are mounted on a support element 29 in such a way as to be spaced apart axially and movable relative to one another in the axial direction. The second friction elements 27b on the support element 29 alternate in the axial direction with the first friction elements 27a, forming a joint friction element pack/plate pack. The second friction elements 27b are attached to the support element 29 for conjoint rotation therewith. The second friction elements 27b and the support element 29 together form the second clutch part 7a. The support element 29 is furthermore rotationally connected to an input shaft 30 of the hybrid module 2.

In an operating state illustrated in the FIGURE, the input shaft 30 provides the second clutch part 7a with a rotational connection to the output shaft 22 of the internal combustion engine. In this illustrative embodiment, a torsional vibration damper designed as a dual mass flywheel is additionally inserted between the output shaft 22 and the input shaft 30 in the torque transmission direction. The torsional vibration damper 31 connects the input shaft 30 permanently to the output shaft 22 for conjoint rotation therewith.

The first clutch 8 is thus configured as a separating clutch with respect to the internal combustion engine. The two other clutches 9 and 10 are each configured as a component clutch of a double clutch/double clutch device.

The second clutch 9 and the third clutch 10 are constructed substantially in the same way as the first clutch 8. Accordingly, both the second clutch 9 and the third clutch 10 have a first clutch part 6b, 6c. The first clutch parts 6b, 6c too are each embodied with a plurality of first friction elements 27a, which are mounted on the rotor carrier 11, namely on the sleeve region 26, in a manner which prevents relative rotation but allows axial movement. The clutches 9 and 10 are furthermore connected to one of the transmission input shafts 12, 13 by means of a second clutch part 7b and 7c respectively.

The friction elements 27a and 27b of the second clutch 9 are arranged radially on the outside of the friction elements 27a and 27b of the first clutch 8. The friction elements 27a and 27b of the second clutch 9 also partially overlap the friction elements 27a and 27b of the first clutch 8 in the axial direction. The plurality of first friction elements 27a of the second clutch 9 is mounted on an inner circumferential side of the rotor carrier 11 for conjoint rotation therewith. These first friction elements 27a once again alternate in the axial direction with the second friction elements 27b of the second clutch 9, which are mounted on a further support element 32 for conjoint rotation therewith. The support element 32 is connected to the first transmission input shaft 12 of the transmission device 14 for conjoint rotation therewith by means of splines.

The first friction elements 27a of the third clutch 10 are likewise attached to the sleeve region 26 on an inner circumferential side of the rotor carrier 11 for conjoint rotation therewith, wherein a second friction element 27b of the third clutch 10 is once again in each case arranged between two adjacent first friction elements 27a. Thus, the friction elements 27a and 27b of the third clutch 10 are once again arranged in such a way that, like the friction elements 27a and 27b of the second clutch 9, they together form a friction element pack. A plurality of second friction elements 27b of the third clutch 10 is mounted on a further support element 33 (of the third clutch 10) in a manner which prevents relative rotation and allows movement relative to one another in the axial direction. The support element 33 is mounted on a radial outer side of the second transmission input shaft 13, which is designed as a hollow shaft, for conjoint rotation therewith by means of splines.

In this illustrative embodiment, the first transmission input shaft 12 is the transmission input shaft which passes through the second transmission input shaft 13 in the axial direction. The first transmission input shaft 12 is likewise designed to be hollow/as a hollow shaft, at least partially, and in this case in fact over its entire length, but, as an alternative, can also be designed as a solid shaft.

A central support member 15, which extends in the radial direction in relation to the axis of rotation 24 and is mounted/supported on the second transmission input shaft 13, is formed on the rotor carrier 11. Thus, the rotor carrier 11 is mounted directly on the second transmission input shaft 13 so as to be rotatable relative thereto. When viewed in the axial direction, the central support member 15 extends between the two clutches 9 and 10 in the radial direction from the sleeve region 26 inward toward the second transmission input shaft 13. The central support member 15 is supported rotatably relative to the second transmission input shaft 13 by means of a rolling bearing 16 in the form of a ball bearing. The rolling bearing 16 is clamped between an outer circumferential side of the second transmission input shaft 13 and an inner circumferential side of the central support member 15. The rolling bearing 16 serves directly both for radial and preferably also axial support of the rotor carrier 11 relative to the second transmission input shaft 13. The rolling bearing 16 is arranged axially between the two sets of splines of the support elements 32 and 33 with the respective transmission input shaft 12, 13. The rolling bearing 16 is therefore arranged centrically/centrally between the second clutch 9 and the third clutch 10 in the axial direction.

It can furthermore be seen that the second clutch part 7a of the first clutch 8 is rotatably mounted relative to the disk region 28 by means of a further rolling bearing 34 in the form of a ball bearing. Thus, the second clutch part 7a and, in turn, the input shaft 30 are supported/mounted relative to the rotor carrier 11 and thus indirectly also relative to the second transmission input shaft 13.

It can furthermore be seen in the FIGURE that the respective clutch 8, 9, 10 is provided with an actuating system 17, 18, 19. The first clutch 8 is actuated by means of a first actuating system 17. This first actuating system 17 is hydraulically actuated. The first actuating system 17 has a rotary union 35, which is configured in such a way that, to actuate the first clutch 8, it guides the corresponding pressurized fluid, preferably a pressurized oil, into the interior of the hybrid module 2 via the input shaft 30 in order to actuate the first clutch 8. For the sake of clarity, the detailed guidance of the pressurized fluid is not illustrated specifically.

A second actuating system 18 of the second clutch 9 is implemented by means of a slave cylinder 20. The third clutch 10 is also actuated by means of a (third) actuating system 19 having a slave cylinder 21. The two slave cylinders 20 and 21 are accommodated together in a common slave cylinder unit. In particular, this slave cylinder unit is designed as a double CSC. As an alternative, however, it is also possible in turn to design each of the two actuating systems 18 and 19 of the second and third clutches 9, 10 with a respective rotary union.

In principle, it should be noted that, instead of the triple clutch, it is also possible in other embodiments to provide just a double clutch comprising just two of the three clutches 8, 9, 10 in the hybrid module 2. In this case, only one of the two transmission input shafts 12, 13 is then also designed or used in accordance with the second transmission input shaft 13 of the previously described preferred illustrative embodiment.

In other words, an entire rotating part (that part of the hybrid module 1 which is coupled to the rotor carrier 11) is mounted on one of the transmission input shafts 13. In comparison with the prior art, this eliminates a wall, leading to an installation space advantage of about 10 mm. Owing to the bearing basis, the offset between the axes of the clutch disk and input shaft is significantly reduced. All that is required to separate the wet space from the dry space is a cover plate. As shown in the overall section in the FIGURE, the entire clutch (third clutch 10) is mounted on the hollow shaft (second transmission input shaft 13) by means of a ball bearing 16. The hybrid module input shaft 30 is no longer mounted on the partition wall but on the rotor carrier 11. K1/K2 (second clutch 9 (K1) and third clutch 10 (K2)) are actuated via double CSCs (the FIGURE) or, alternatively, via rotary unions. The K0 (first clutch 8) is actuated via a rotary union 35; the pressurized oil is fed in via the input shaft 30.

LIST OF REFERENCE SIGNS 1 drivetrain unit
2 hybrid module
3 stator
4 rotor
5 electric machine
6a first clutch part of the first clutch
6b first clutch part of the second clutch
6c first clutch part of the third clutch
7a second clutch part of the first clutch
7b second clutch part of the second clutch
7c second clutch part of the third clutch
8 first clutch
9 second clutch
10 third clutch
11 rotor carrier
12 first transmission input shaft
13 second transmission input shaft
14 transmission device
15 central support member
16 rolling bearing
17 first actuating system
18 second actuating system
19 third actuating system
20 first slave cylinder
21 second slave cylinder
22 output shaft
23 housing
24 axis of rotation
25 laminated core
26 sleeve region
27a first friction element 27b second friction element
28 disk region
29 support element of the first clutch
30 input shaft
31 torsional vibration damper
32 support element of the second clutch
33 support element of the third clutch
34 rolling bearing
35 rotary union

The invention claimed is:

1. A drivetrain unit for a motor vehicle, comprising:
a hybrid module, which includes an electric machine having a stator and a rotor, with at least two clutches, which have clutch parts that are respectively connectable to one another, and with a rotor carrier, to which the rotor is attached and to which in each case one clutch part of the at least two clutches is connected for conjoint rotation therewith, and
a transmission device, which interacts with the hybrid module by a first transmission input shaft,
wherein the rotor carrier is mounted on the first transmission input shaft so as to be rotatable relative thereto,
wherein a first clutch of the at least two clutches has a first clutch part and a second clutch part, which is mounted on the rotor carrier to be rotatable relative thereto, and
wherein the first clutch is actuated by a first actuating system having a rotary union.

2. The drivetrain unit as claimed in claim 1, wherein the rotor carrier has a central support member, which is supported on the first transmission input shaft via a rolling bearing.

3. The drivetrain unit as claimed in claim 1, wherein a second clutch of the at least two clutches has a first clutch part and a second clutch part, which is connected to a second transmission input shaft for conjoint rotation therewith.

4. The drivetrain unit as claimed in claim 3, wherein the second clutch is actuated by a second actuating system, which has a central slave cylinder or a rotary union.

5. The drivetrain unit as claimed in claim 4, wherein a third clutch of the at least two clutches has a first clutch part and a second clutch part, which is connected to the first transmission input shaft for conjoint rotation therewith.

6. The drivetrain unit as claimed in claim 5, wherein the third clutch is actuated by a third actuating system, which has a central slave cylinder or a rotary union.

7. The drivetrain unit as claimed in claim 1, wherein:
a second transmission input shaft projects through the first transmission input shaft designed as a hollow shaft.

8. The drivetrain unit as claimed in claim 1, wherein one or more or all of the at least two clutches is/are of wet design.

9. The drivetrain unit as claimed in claim 1, wherein an input shaft of the hybrid module is mounted on the rotor carrier so as to be rotatable relative thereto.

10. A drivetrain unit for a motor vehicle, comprising:
a hybrid module including:
a housing;
an electric machine having a stator mounted on the housing and a rotor supported on a rotor carrier, wherein the rotor carrier is mounted on a first transmission input shaft and is rotatable relative thereto;
a first clutch having a first clutch part and a second clutch part, wherein the first clutch part is connected to the rotor carrier and the second clutch part is connected to an input shaft of the hybrid module;
a second clutch having a first clutch part and a second clutch part, wherein the first clutch part is connected to the rotor carrier and the second clutch part is connected to a second transmission input shaft; and
a third clutch having a first clutch part and a second clutch part, wherein the first clutch part is connected to the rotor carrier and the second clutch part is connected to the first transmission input shaft, wherein;
the second transmission input shaft passes through the first transmission input shaft in an axial direction,
the rotor carrier is mounted directly on the first transmission input shaft by a support member that extends in a radial direction in relation to an axis of rotation of the hybrid module; and
the support member extends between the second clutch and the third clutch in the radial direction from a sleeve region of the rotor carrier inward toward the first transmission input shaft.

* * * * *